United States Patent [19]
Schifftner

[11] Patent Number: 5,336,284
[45] Date of Patent: Aug. 9, 1994

[54] MULTIPLE THROAT, NARROW GAP VENTURI SCRUBBER AND METHOD OF USING SAME

[75] Inventor: Kenneth C. Schifftner, Encinitas, Calif.

[73] Assignee: Compliance Systems International, Inc., Carlsbad, Calif.

[21] Appl. No.: 38,415

[22] Filed: Mar. 29, 1993

[51] Int. Cl.⁵ .............................................. B01F 3/04
[52] U.S. Cl. ...................... 55/241; 261/44.1; 261/44.7; 261/53; 261/62; 261/116; 261/DIG. 54
[58] Field of Search .............. 261/DIG. 54, 116, 44.1, 261/44.7, 62, 53; 55/241

[56] References Cited

U.S. PATENT DOCUMENTS

| | | | |
|---|---|---|---|
| 2,797,904 | 7/1957 | Voorheis | 261/DIG. 54 |
| 3,284,064 | 11/1966 | Kolm et al. | 261/DIG. 54 |
| 3,339,344 | 9/1967 | Pallinger | 261/DIG. 54 |
| 3,347,024 | 10/1967 | Dock et al. | 261/DIG. 54 |
| 3,393,901 | 7/1968 | Krause | 261/DIG. 54 |
| 3,488,039 | 1/1970 | Ekman | 55/241 |
| 3,584,440 | 6/1971 | Vigil | 261/DIG. 54 |
| 3,638,924 | 2/1972 | Calaceto et al. | 261/DIG. 54 |
| 3,746,322 | 7/1973 | Sawyer | 261/DIG. 54 |
| 3,791,108 | 2/1974 | Hausberg et al. | 261/DIG. 54 |
| 3,870,082 | 3/1975 | Holl | 138/40 |
| 3,957,464 | 5/1976 | Teller | 55/68 |
| 3,969,482 | 7/1976 | Teller | 423/235 |
| 4,000,993 | 1/1977 | Holl | 55/94 |
| 4,012,469 | 3/1977 | Accortt | 261/117 |
| 4,023,942 | 5/1977 | Brady et al. | 55/241 |
| 4,043,772 | 8/1977 | Lundy | 261/DIG. 54 |
| 4,049,399 | 9/1977 | Teller | 55/73 |
| 4,064,202 | 12/1977 | Parenchuck | 261/DIG. 54 |
| 4,067,707 | 1/1978 | Atsukawa et al. | 261/116 |
| 4,140,501 | 2/1979 | Ekman | 55/242 |
| 4,206,159 | 6/1980 | Angelini et al. | 261/DIG. 54 |
| 4,313,742 | 2/1982 | Ostlie | 55/241 |
| 4,337,229 | 6/1982 | Teller | 423/225 |

FOREIGN PATENT DOCUMENTS 6185 of 1906 United Kingdom .................. 55/241

OTHER PUBLICATIONS

Schifftner, K. et al. "Wet Scrubbers", *Air Pollution Engineering Manual* (eds. Buonicore, A. J. et al.), Air & Waste Management Association, Van Nostrand Reinhold, New York, 1992, 78–88.

Perry's Chemical Engineers' Handbook, Sixth Edition, McGraw Hill, 1984, pp. 14–38, 14–39, 18–81, 20–90 through 20–96.

Semrau K. et al. "Wet Scrubber Liquid Utilization," Stanford Research Institute, Menlo Park, Calif., prepared for U.S. Environment Protection Agency—Office of Research and Development under contract No. 68-02-1079, Oct. 1974.

*Primary Examiner*—Tim Miles
*Attorney, Agent, or Firm*—Seidel, Gonda, Lavorgna & Monaco

[57] ABSTRACT

A throat section of a venturi for passing a flow of fluid therethrough comprises a plurality of spaced parallel physical barriers. The physical barriers are oriented parallel to the direction of fluid flow through the throat section. The throat section is installed in a throat zone of a venturi scrubber defined by an upstream zone having an unobstructed upstream section, a throat zone having the throat section, and a downstream section. The spaces between adjacent barriers are from about 3/16 inches to about 8 inches so as to create free stream zones between adjacent barriers. Each barrier may have a selected length which decreases with distance from the axis of the throat section. A method for treating a stream of effluent fluid containing entrained particulates by introducing the effluent fluid and target droplets into the throat section so as to promote impaction therebetween is also described.

46 Claims, 11 Drawing Sheets

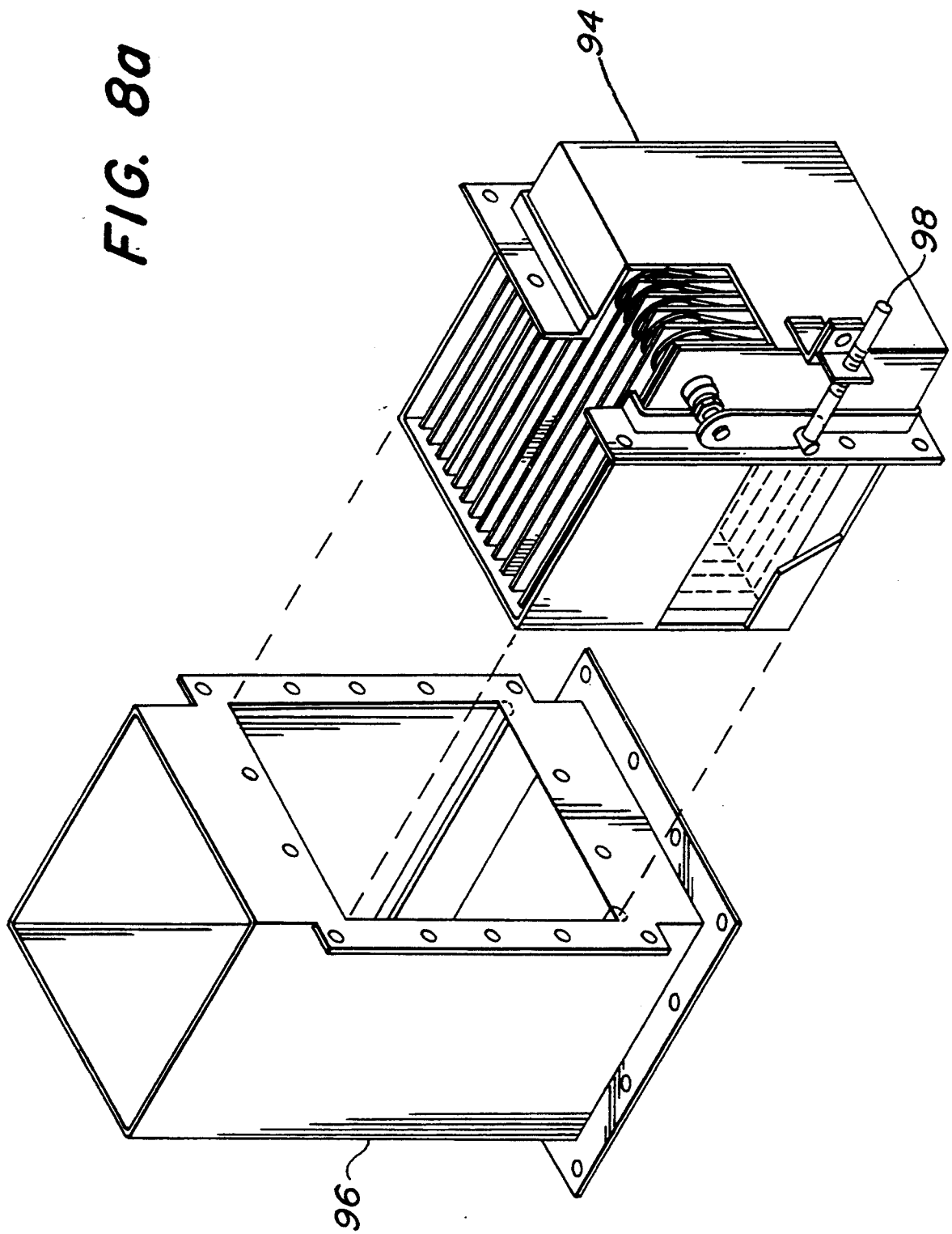

GRADE EFFICIENCY/PENETRATION CURVE

AERODYNAMIC MEAN DIAMETER, $\mu$

MULTIPLE THROAT, NARROW GAP VENTURI SCRUBBER AND METHOD OF USING SAME

FIELD OF THE INVENTION

This invention relates to venturi-type devices which cause a flow of fluid to pass through a plurality of narrow gaps within a throat section of the venturi. The invention employs a plurality of spaced parallel flat plate barriers to create the narrow gaps. The invention is described in the context of, but is not limited to, a venturi scrubber.

BACKGROUND OF THE INVENTION

Venturi devices comprise a duct or pipe providing a fluid flow passageway that decreases progressively in cross-sectional area in an "upstream section" to a minimum at a "throat section," and then increases progressively again in a "downstream section." Fluid forced through the venturi device has its flow velocity increased progressively in the upstream section to reach a maximum at the throat, the velocity decreasing again in the downstream section, usually accompanied by a considerable turbulence of the fluid in the downstream section and in the duct- or pipe-work fed from the device. The passage of fluid through the device is accompanied by a pressure drop therein, the value of which is proportional to the amount of energy or power required to pass the fluid therethrough. It is usually one of the main endeavors of designers of these devices to keep this pressure drop as low as possible, so that the device and the apparatus in which it is incorporated will operate at maximum efficiency and minimum external power requirements.

In a typical gas scrubbing device such as a venturi scrubber, a gas cleaning liquid (e.g., water) is injected into an incoming particle- or particulate-laden gas stream at or very close to the entrance to the venturi throat, where the gas cleaning liquid is immediately atomized by the high-velocity gas stream into a spray or mist droplets. This mist or spray has a high probability of coming into physical contact with solid material mixed in with the gas stream. This high probability results chiefly from the difference in velocity between the slower moving mist droplets, typically called "target droplets," and the faster moving gas-borne particulates. This high contact probability is also enhanced by the above-mentioned turbulence in the gas downstream of the throat. The liquid droplets pick up the particulate matter after which the droplets holding the particulate material are removed from the stream and collected. A centrifugal entrainment collector is typically employed for receiving and removing the particulate-laden droplets.

The overall collection efficiency of a venturi scrubber is highly dependent on the throat velocity or pressure drop, the liquid-gas-ratio, the chemical wettability of the particulate, and the energy expended to create the target droplets.

The overall effectiveness of the venturi scrubber is a direct function of the percentage of particulates removed from the incoming particulate-laden gas stream. Since the particulates are captured mainly by attaching themselves to target droplets, a major concern in the design of a venturi scrubber is to allow for maximum probability of interaction between target droplets and the particulate-laden gas stream while the gas stream flows through the throat of the venturi scrubber.

In a conventional venturi scrubber, a particulate bearing carrier gas is caused to accelerate when it is forced to pass through a restriction in the containing ductwork (venturi throat). The static pressure of the slow moving gas stream is converted to velocity pressure in the restriction as the gas velocity increases.

Conventional venturi theory holds that the velocity pressure of the carrying gas stream shears the liquid which is administered into the gas stream into fine droplets. The shearing action comes from the differential in velocity of the gas stream relative to the liquid. The size of the resulting droplet created is related to various venturi scrubber physical parameters such as relative velocity, liquid surface tension and viscosity, carrier gas density and viscosity, gas/liquid temperatures, liquid to gas ratio, and other factors.

The target droplets in most of the mathematical models are assumed to be flowing as individual droplets in the gas stream. The particulates, depending upon their size, either flow along streamlines in the gas flow or move through the carrier gas as dictated by thermophoretic, or diffusiophoretic forces.

Generally speaking, the smaller the droplet and the greater the density of droplets per unit volume, the smaller the particle that can be collected. Smaller droplets, given their radius of curvature and reduced surface tension, are assumed to be easier to penetrate. The size of the droplets created is primarily related to scrubber pressure drop.

Equations were developed to predict this pressure drop from certain known operating parameters. Particulate removal efficiencies, however, always seem to be overly optimistic when using the common mathematical models. In other words, either the "real-world" venturi scrubbers had inherent inefficiencies built into them, or the models were wrong. An implication of the results could be that the mechanism for droplet creation could be improved. Another implication could be that the droplets, once created, were not being used properly.

The conventional venturi theory contends that the shearing action in the restricted throat zone creates the droplets. The target droplets in the free stream zone of the throat (the area at or near the center of the throat) would most closely follow the model, but those at or near the throat wall (where local velocities are lower) would not. When the throat zone ended and the venturi section enlarged, the gases and the "large" liquid droplets in the free stream zone would slow down rapidly but the smaller particulate given their smaller size, would continue on their course. The particulate would impact into the slower target droplet and thereby be captured. The smaller particles (below about 0.3 microns) would exhibit little inertia (given their low mass) and would instead by captured by diffusion or interception.

When clear venturi scrubber models were built, however, it was evident that the gas velocity through the typical venturi scrubber throat varied considerably with throat width. Near the wall, the liquid formed a thin stream of liquid with very few droplets and therefore low efficiency. As one moved towards the higher velocities in the center of the throat (free stream area), greater numbers of smaller droplets were created. It is in this center region that the particulate capture models would seem to truly apply. If one could create a throat having a uniform free stream area, with concentrated zones of very small droplets, the capture should improve and more closely follow the mathematical model.

Over the decades that venturi scrubbers have been in use, widely varying throat designs have been tried in an attempt to maximize the scrubber performance.

Attempts have been made to improve recovery efficiency in a venturi throat by placing an obstruction in the throat zone. U.S. Pat. No. 4,023,942 describes a double diamond insert that separates the gas flow through the throat zone into a pair of diverging, constant cross-section throats. The double diamond insert is adjustable so as to be positionable in selected vertical locations within the venturi passage. A similar type of insert is disclosed in U.S. Pat. Nos. 4,049,399, 4,337,229, 3,957,464 and 3,969,482. One disadvantage of the diamond shape is that it creates skewed paths, thereby increasing the complexity of the gas flow path. The inclined angle of the velocity zone (the throat zone) has further disadvantages. In practice, the water target droplets try to move straight downward, impacting on the movable throat section, and causing excess pressure drop. Also, the inclined angle promotes angled collisions between target droplets and gas-entrained particles. Since maximum kinetic energy transfer occurs when the particle directly impacts the center of the droplet, the angled throat does not promote desired direct impact collisions of target droplets and particles.

U.S. Pat. No. 3,870,082 discloses the placement of a plurality of flat parallel physical barriers within a venturi-type device. Although the barriers traverse the venturi throat section, all of the barriers deliberately extend into both the upstream section and the downstream section. In fact, by using barriers of progressively different lengths, the leading and trailing edges of the barriers themselves form the required upstream and downstream sections. For example, the upstream section in U.S. Pat. No. 3,870,082 encompasses the area defined by the leading edges of plates 27 and 28 that extend beyond the shortest plates 29, as depicted in FIG. 1. In this manner, plates 27 and 28 both form and obstruct the upstream section. Within the venturi throat section, all of the barriers have identical lengths. U.S. Pat. No. 3,870,082 teaches that the preferred spacing between the parallel physical barriers is between 5 to 15 times the maximum size of particle that is to be removed by the device. In an exemplary embodiment, a spacing of 0.016 inches (approximately 1/64 of an inch) is employed. U.S. Pat. No. 3,870,082 further discloses that with the preferred spacings the gas flow between the plates is in the form of two back-to-back turbulent boundary layers between two immediately-adjacent liquid films, as illustrated in FIG. 5 of this patent. As described in U.S. Pat. No. 3,870,082, this effect leads to a very high probability that the particles will be trapped by the liquid film and removed from the air stream. Thus, it should be evident that the parallel plate design, as depicted in FIG. 5 of this patent, is not designed to create or employ any free stream zones. Particle capture is mainly performed by the effects of the back-to-back turbulent boundary layers.

In U.S. Pat. No. 3,870,082, a scrubbing liquid is sprayed out from nozzles 23 or 24. As depicted in FIG. 5 of this patent, the liquid runs down the surfaces of the physical barriers to provide thin films 32 thereon. The thin films of liquid are contacted by a particle-laden gas stream (e.g., furnace exhaust gases) which passes between adjacent barriers as the two back-to-back turbulent boundary layers mentioned above. The thin films 32 of liquid capture the particles and carry them away as the liquid trickles down along the surfaces of the physical barriers.

The physical barriers disclosed in U.S. Pat. No. 3,870,082 are also employed in U.S. Pat. No. 4,000,993.

U.S. Pat. No. 4,140,501 discloses a wet gas scrubber having a multiple-throat venturi section. The venturi section comprises three modular venturi units arranged side-by-side for the flow of the air stream therethrough in parallel. Each module comprises a plurality of vertically disposed rods arranged in a plane transverse to the direction of flow of the air stream in spaced-apart relationship. The rods may be, for example, one-inch pipes spaced apart to leave one inch venturi throats between adjacent pipes. In U.S. Pat. No. 4,140,501, length of the venturi throat will necessarily be limited by the diameter of the rods. The throat lengths in the disclosed embodiment will be very short (e.g., one inch) thereby providing only a very small area for particle impaction and capture. The extremely short throat distance does not permit the liquid particles to have any meaningful residence time within the throat zone. Thus, there can be no meaningful mixing of the incoming gas stream with the liquid particles so as to encourage impaction and collection of particulate matter entrained in the incoming gas stream. The venturi throat in U.S. Pat. No. 4,140,501 is probably more accurately characterized as a narrow orifice contactor, as opposed to a venturi.

U.S. Pat. No. 4,012,469 discloses a wet gas scrubber having a throat region comprising an upper and lower row or tray of tubular scrubber rods. The rods are spaced in relation to each other in the direction of the gas flow and are in a parallel relation with one another. The upper rods are connected to a fluid distribution system and have openings in the tube walls for providing wash liquid. The wash liquid (e.g., water droplets) exits the tube walls countercurrent to the incoming gas flow. The incoming gas with foreign particles and liquid droplets entrained therein passes through several venturis formed between the rods of the upper row and the rods of the lower row, thereby causing an increase in velocity. During the traversal of the gas through these venturis, the water droplets are broken up into smaller sizes depending on the velocity of the gas and the resulting drag forces and intimate contact between the particulate matter and the water droplets is produced. There thus results an agglomeration action in the venturi. In U.S. Pat. No. 4,012,469, the lower row of rods is vertically adjustable so as to, in effect, form adjustable venturis between the two rows of rods. In other words, the lower row of rods move up and down perpendicular to the gas flow. The lower row of rods, however, never rise up between the upper tubes and assume the same location, on the same plane. In operation, the lower tubes act like baffles.

In spite of extensive research and exhaustive attempts to improve the performance of venturi scrubbers, there is still a need for further improvements which increase particle capture without significantly affecting the pressure drop, and thereby the amount of energy required to pass the fluid therethrough. There is also still a need for venturi throat inserts which are simple to fabricate, which do not significantly alter the incoming path flow of gas as it passes therethrough and which promotes direct impact collisions between target droplets and particles. The present invention fills that need.

SUMMARY OF THE INVENTION

To create drag without destroying droplet dispersion, fiat plates are oriented parallel to the gas flow in the throat area. The frictional drag of the gas as it flows parallel to the plate surface, even at high Reynold's numbers, creates the necessary drag without the addition of complex elements to the free stream zone of the throat. The plates are oriented close together to create a narrow free stream area with the greatest droplet dispersion per unit volume. The narrow throat reduces the path length for small particle diffusion.

In one embodiment, the present invention defines a throat section of a venturi for passing a flow of fluid therethrough wherein the venturi comprises a plurality of spaced parallel physical barriers. The physical barriers are oriented parallel to the direction of fluid flow through the throat section. The spaces between adjacent barriers are from about 3/16 inches to about 8 inches so as to create free stream zones between adjacent barriers.

In another embodiment, the invention defines a venturi scrubber apparatus having a passageway for the flow of fluid therein. The passageway comprises, in order, an upstream zone, a throat zone having a throat section, and a downstream section. The throat section comprises a first plurality of spaced parallel physical barriers oriented parallel to the direction of fluid flow through the throat zone. The upstream zone has an unobstructed upstream section of one or more cross-sectional areas. The throat zone has a throat section of a selected length measured in the direction of the fluid flow, cross-sectional area and total area. The throat section cross-sectional area is smaller than the cross-sectional area of the upstream section. The downstream section has one or more cross-sectional areas which are greater than the cross-sectional area of the throat section.

In still another embodiment, the invention defines a venturi scrubber apparatus having a passageway for the flow of fluid therein. The passageway comprises, in order, an upstream zone, a throat zone having a throat section, and a downstream section. The throat section comprises a first plurality of spaced parallel physical barriers oriented parallel to the direction of fluid flow through the throat zone. Each barrier has a selected length. The length of the barriers decrease with distance from the axis of the throat section. The upstream zone has an upstream section of one or more cross-sectional areas. The throat section has a selected length measured in the direction of the fluid flow, cross-sectional area and total area. The throat section cross-sectional area is smaller than the cross-sectional area of the upstream section. The downstream section has one or more cross-sectional areas which are greater than the cross-sectional area of the throat section.

In still another embodiment, the invention defines a method for treating a stream of effluent fluid containing entrained particulates. The method comprises the steps of (a) introducing the effluent fluid into a throat section of a venturi having a plurality of spaced parallel physical barriers oriented parallel to the direction of fluid flow through the throat section; (b) simultaneously causing target droplets to form in the throat section and to disperse throughout the spaces between the parallel barriers; and (c) adhering at least some of the particulates to the target droplets as the effluent fluid passes through the throat section. In this manner, the particulates are separated from the stream of effluent fluid.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 8a illustrates an exploded view of a manually adjusted multiple throat assembly, prior to insertion into an empty throat zone tube section.

DESCRIPTION OF THE INVENTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
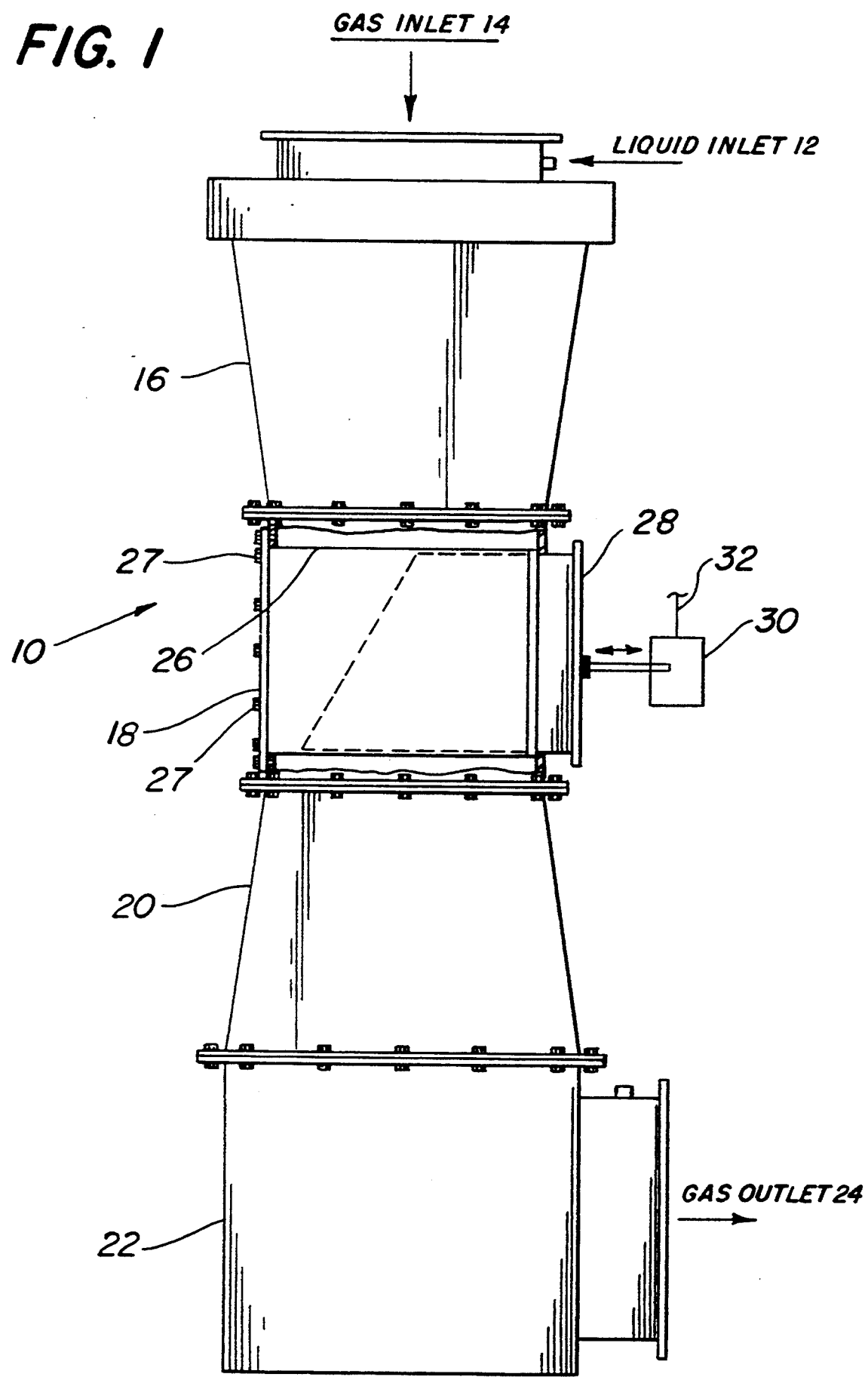
FIG. 1 is a perspective view of a venturi scrubber according to the present invention.

Referring now to the drawings, wherein like numerals indicate like elements, there is shown in FIG. 1 selected components of a venturi scrubber 10 which according to the present invention includes a liquid inlet port 12 and a gas inlet port 14 which empty into converging section 16, The converging section 16 connects to throat zone 18, which in turn, connects to diverging section 20. The diverging section 20 connects to elbow 22, which in turn, connects to gas outlet port 24. The throat zone 18 contains fixed plate group 26 and optional movable plate group 28 therein, the construction of which is detailed in FIG. 2. The fixed plate group 26 can be either fastened within a normally empty throat zone 18 or can be integrally formed with the throat zone tube section. In the depicted embodiment, the fixed plate group 26 is fastened to the throat tube by bolts 27.

In this manner, the fixed plate group 26 could be retrofitted into existing rectangular venturis which typically have empty or hollow throat zones by cutting a hole in one of the four sides and sliding the entire apparatus into the throat. This type of installation also allows for removal and/or replacement of the fixed plate group 26. Alternatively, new installations could be constructed with a fixed plate group 26 built into the throat zone 18.

FIG. 1 also shows an optional movable plate group 28 which slidingly engages spaces between plates of the fixed plate group 26 as will be described in detail below. The movable plate group 28 is either manually positioned or dynamically positioned by a position control means 30 which receives a signal 32 representing the throat zone gas velocity.

Figure 2:
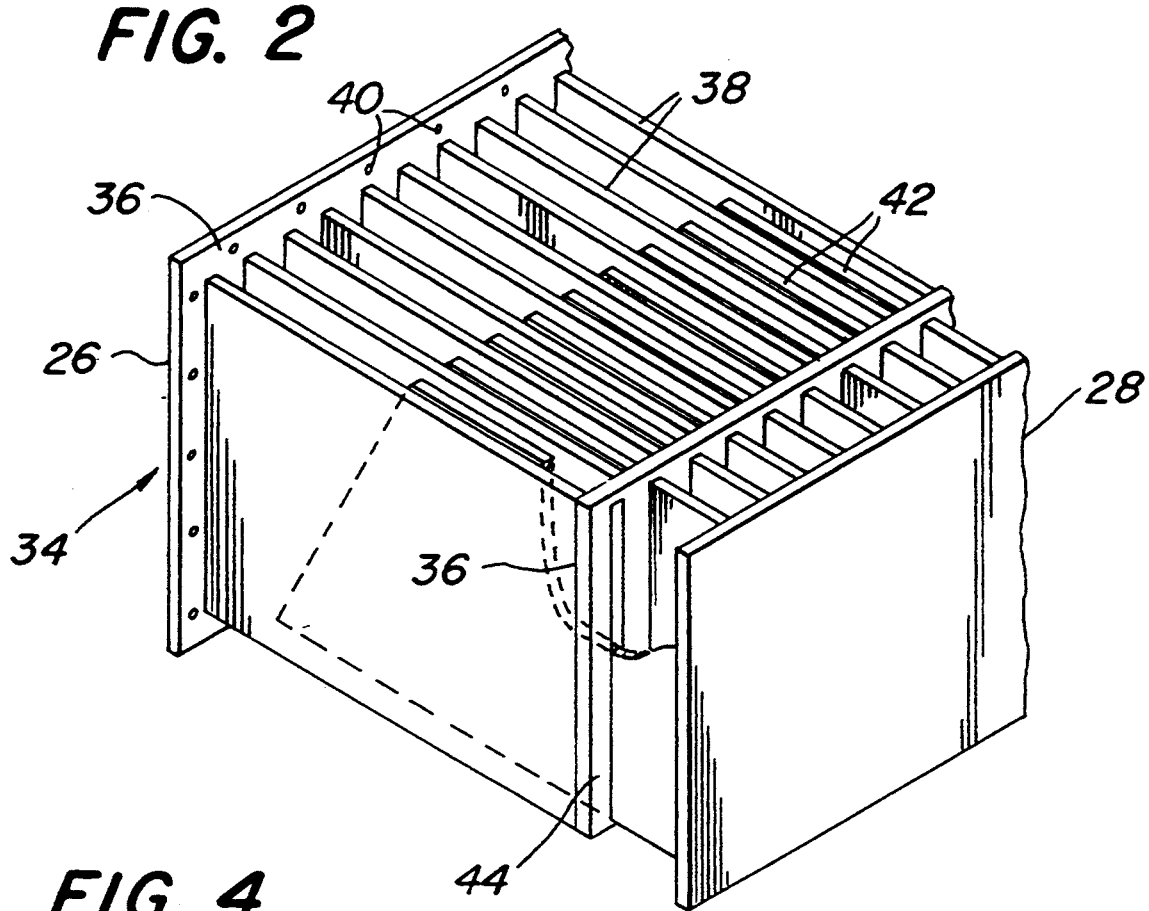
FIG. 2 illustrates one embodiment of a multiple throat assembly that is placed in the venturi zone.
Figure 4:
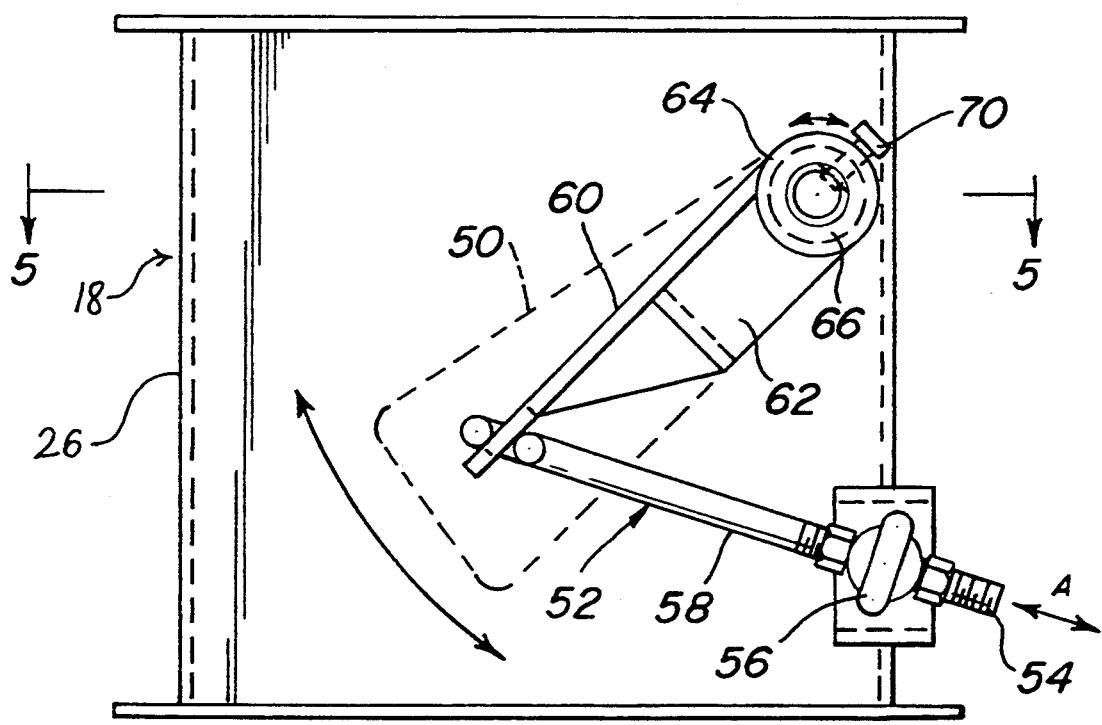
FIG. 4 is a side view of a mechanism which moves blades into and out of spaces within the venturi throat, thereby changing the area of the venturi zone.

FIG. 2 shows assembly 34 comprising fixed plate group 26 and optional movable plate group 28 as the assembly 34 appears before installation in throat zone 18. The fixed plate group 26 includes two oppositely disposed frame portions 36. A series of evenly spaced fixed parallel plates 38 extends between the frame portions 36. One or both frame portion 36 contain holes 40 around the frame for allowing the fixed plate group to be bolted to the throat zone 18. Optional movable plate group 28 has a series of evenly spaced fixed parallel plates 42 which slidingly engage spaces between adjacent plates 38 of the fixed plate group 26 in an interlocking finger-like manner. Movement of the movable plate group 28 into and out of the fixed plate group allows for adjustment of the hydraulic diameter of the throat zone 18. The hydraulic diameter is the net open area of the throat and is also called the "hydraulic area."

The concept of "hydraulic diameter" holds that a venturi scrubber will provide a certain pressure drop regardless of its precise geometrical configuration. Venturi scrubbers with rectangular throats, as depicted in the figures, are characterized by a pressure drop very similar to the pressure drop in venturi scrubbers with round throats of the same area. The throat geometry has a only a very minor effect on the pressure drop.

As described above, movable plates 42 move into and out of the spaces between fixed plates 38. As the gas velocity decreases, the plates 42 may be moved into the spaces between fixed plates 38 (plates 42 move into the gas stream) to reduce the throat area. As the gas velocity increases, the plates 42 can be moved out of the spaces between fixed plates 38 (plates 42 move out of the gas stream) to increase the throat area. Thus, the movement of plate group 28 is a dynamic process which depends upon the instantaneous value of the throat zone gas velocity signal 32 shown in FIG. 1. When the position control means 30 shown in FIG. 1 is operating in an automatic mode, the signal 32 causes the position control means 30 to move the plate group 28 into and out of the throat zone 18.

The portions of the plates of movable plate group 28 which extend into the fixed plate group 26 are preferably wedge-shaped. The wedge shape improves the smoothness of the transition as the movable plates 42 are moved into the gas stream. If the leading edges of the plates 42 were square, the pressure drop across the throat may increase abruptly, causing a temporary increase in turbulence within the throat zone 18. This temporary turbulence would create wildly fluctuating gas velocity readings which would, in turn, result in loss of smooth control of the movement of plate group 28 into and out of the throat zone 18.

Slotted seal 44 seals the right-hand frame 36 from the outside environment. In the preferred embodiment, seal 44 would be a resilient material so as to allow for uninhibited movement of movable plate group 28, while simultaneously serving as an effective barrier between the inside of the throat zone 18 and the outside environment. Of course, if the optional movable plate group 28 was not employed, another sealing means such as a door or cover plate (not shown) would provide the necessary barrier between the inside of the throat zone 18 and the outside environment.

It is not necessary that the plates 42 of movable plate group 28 tightly interlock with plates 38 of the fixed plate group 26. To the contrary, the spacing between oppositely disposed surfaces of a pair of adjacent plates 38 and 42 can be quite large without affecting the operation of the device. Due to the fact that gas will take the path of least resistance, the gas will flow through the more open areas (e.g., the spaces between plates 38 which are not restricted by plates 42). Furthermore, in experimental trials, spacing between oppositely disposed surfaces of a pair of adjacent plates 38 and 42 as large as 3/16 of an inch has been found to be effectively sealed by a film of scrubbing liquid that forms on the surfaces, thereby providing an effective barrier to gas flow between the spaces.

Figure 3:
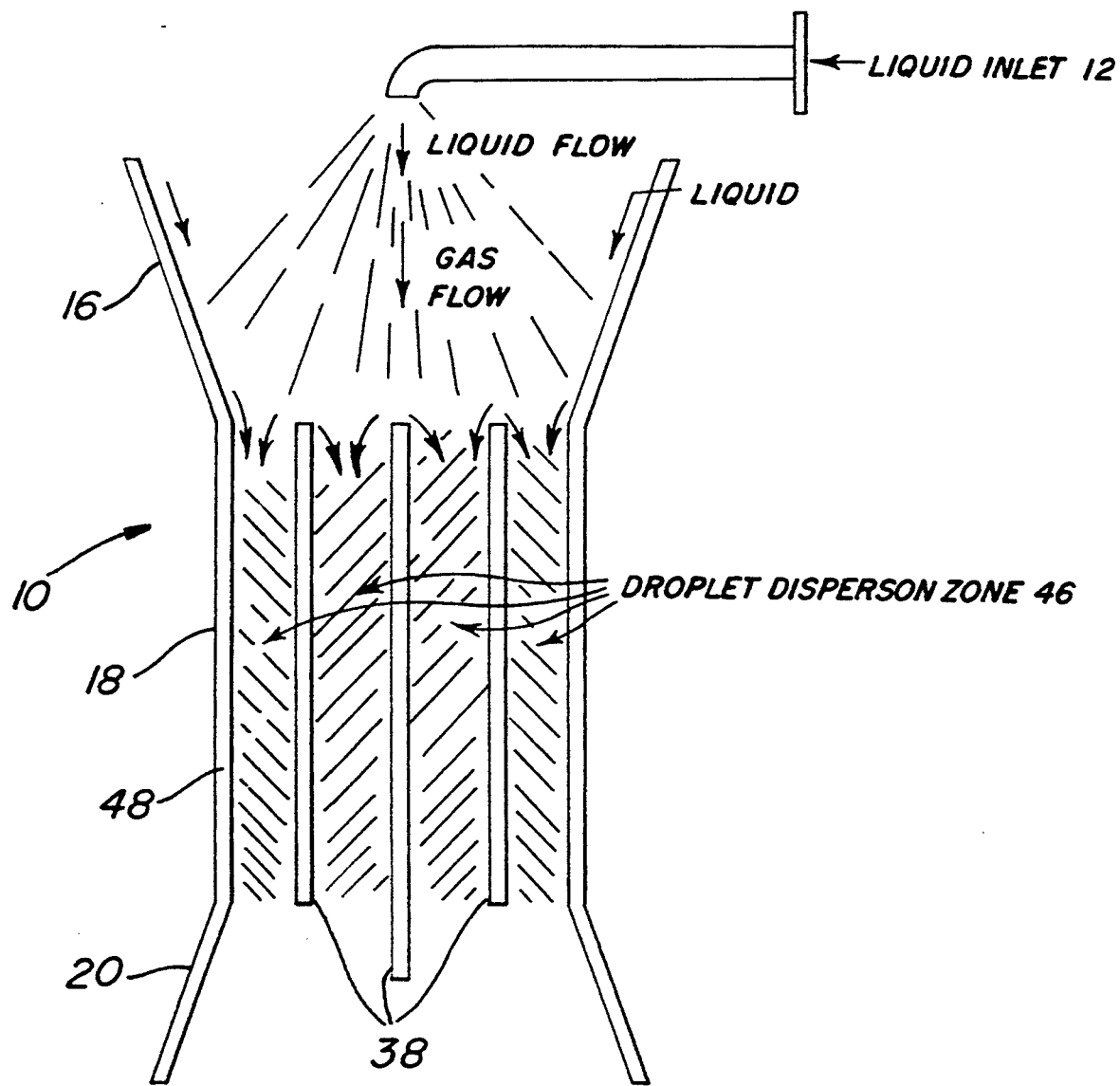
FIG. 3 illustrates a perspective view of the novel multiple throat assembly during operation of the venturi scrubber.
Figure 5:
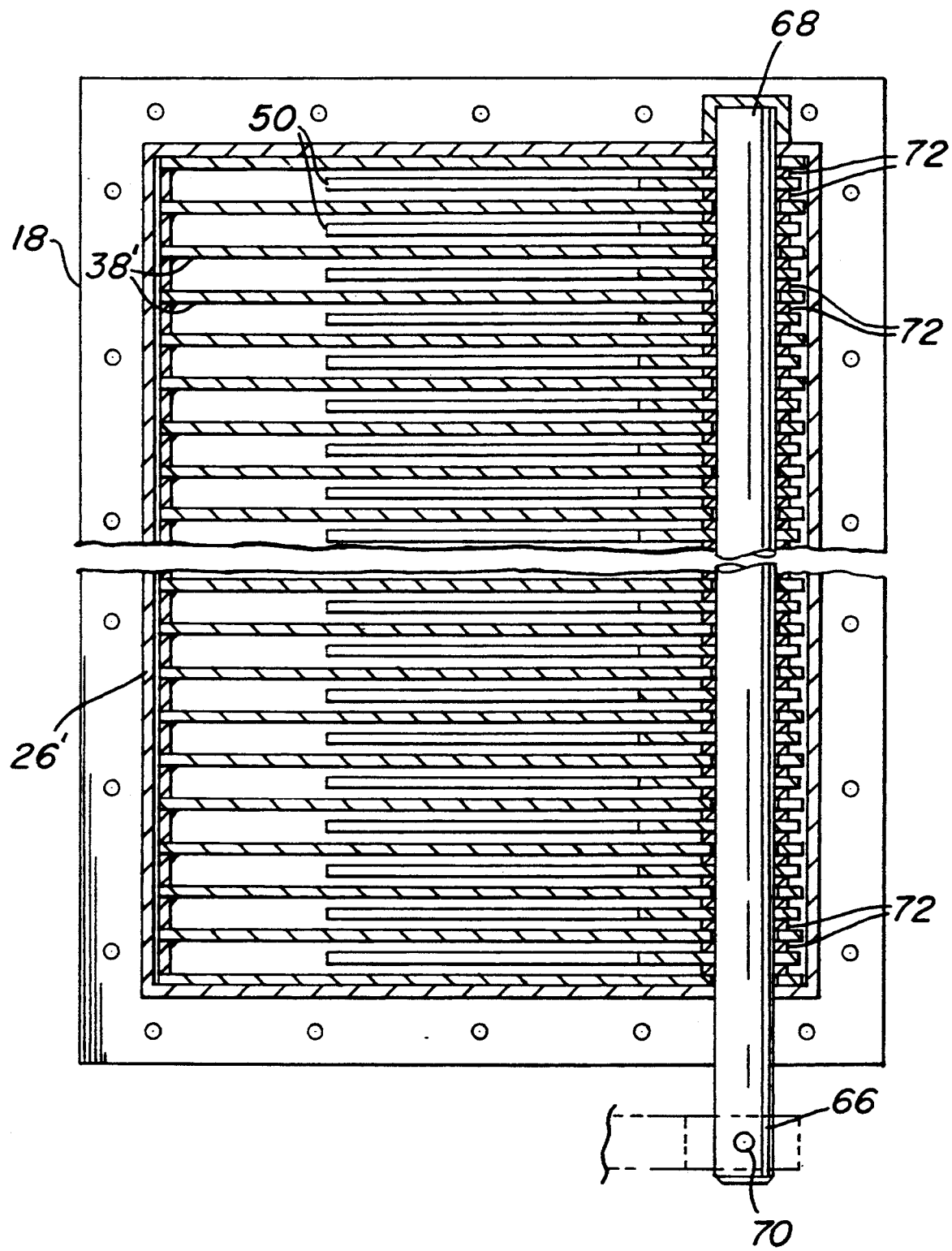
FIG. 5 is a sectional view of the venturi throat zone taken along lines 5—5 in FIG. 4 showing the multiple throat assembly containing movable blades which adjust the throat area.
Figure 6A:
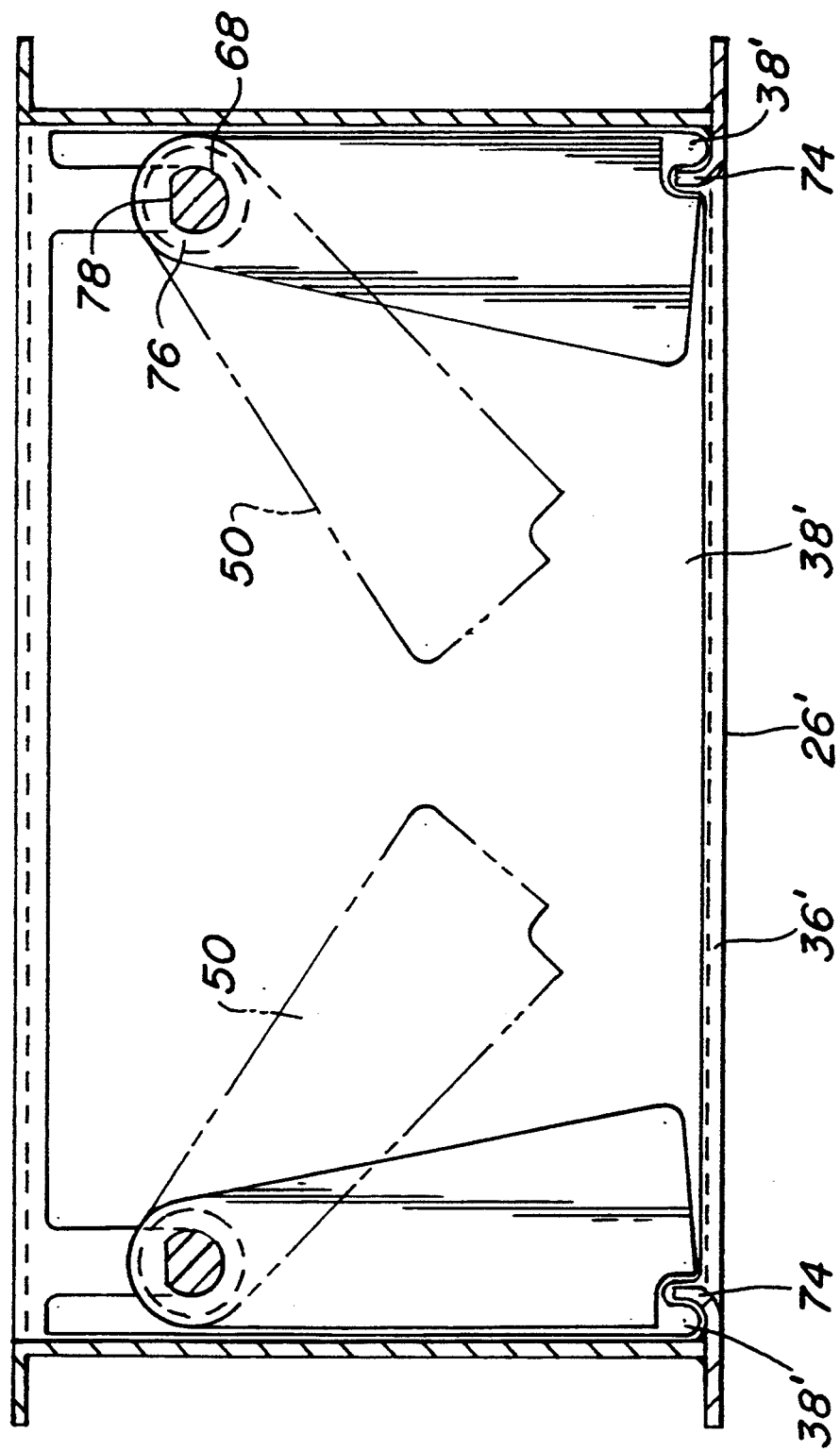
FIGS. 6a and 6b illustrate a sectional side view of the multiple throat assembly showing movable blades opposed to one another with respect to the sides of the throat. The blades adjust the throat area.
Figure 6B:
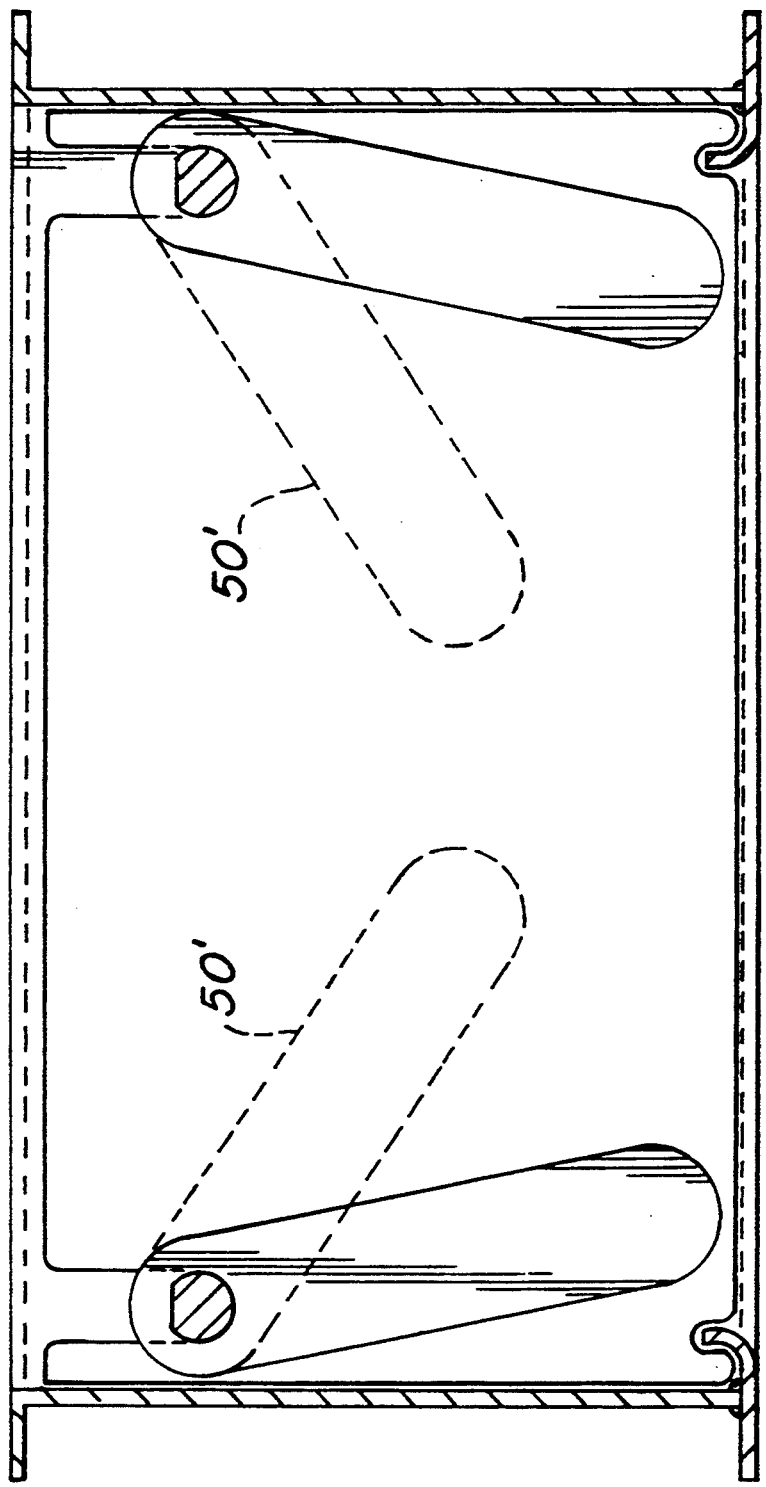
Figure 7:
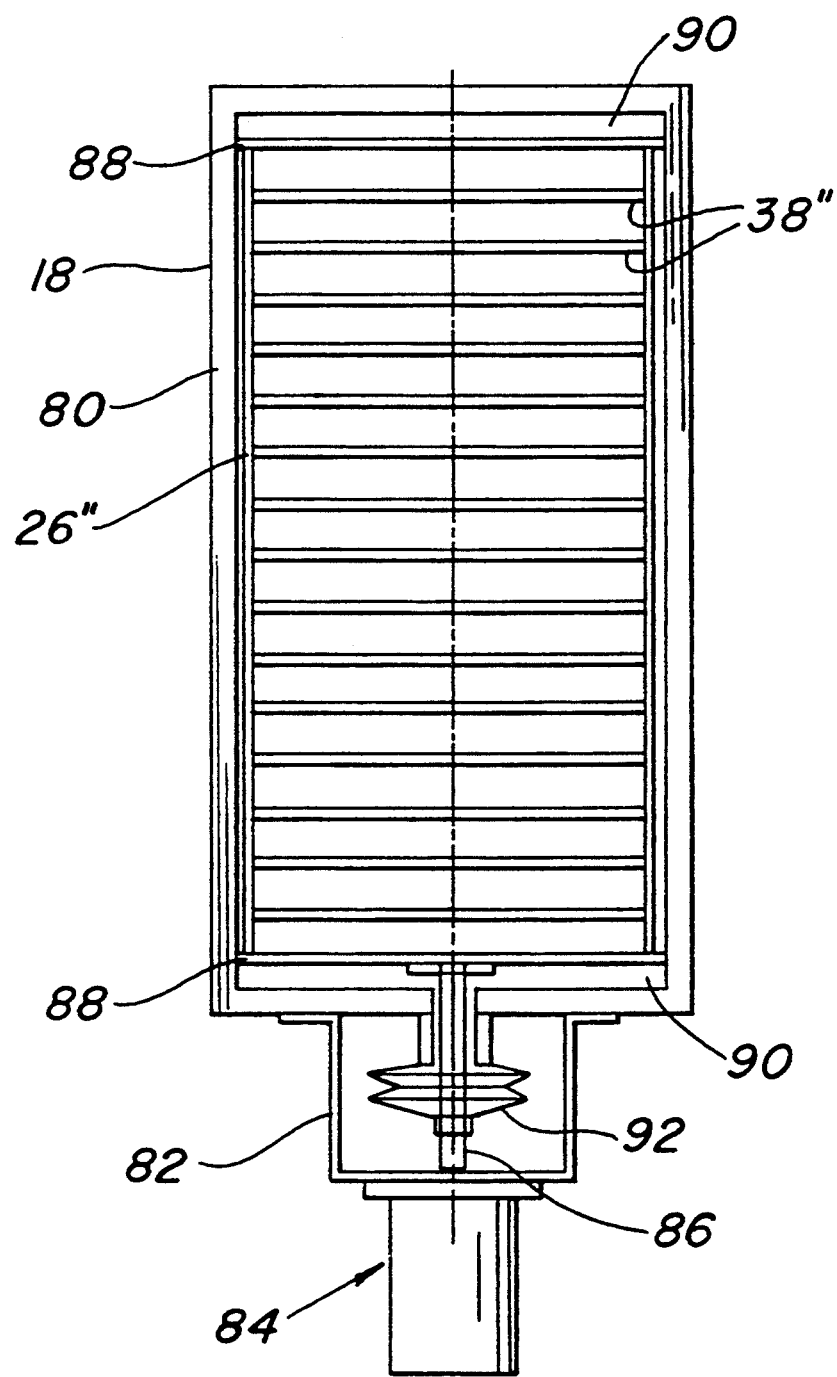
FIG. 7 illustrates an alternative embodiment of the multiple throat assembly showing how the structure may be vibrated to enhance its performance.

FIG. 3 is a perspective view of selected portions of venturi scrubber 10 in operation showing liquid inlet 12, converging section 16, throat zone 18 and diverging section 20. Also visible in this view are parallel plates 38 which preferably form part of fixed plate group 26 (not labelled). The central regions of space between two adjacent plates 38 define droplet dispersion zones 46.

In the simplified embodiment depicted in FIG. 3, only three plates 38 are shown. One important optional features of the invention is that the plates 38 in the central region of the throat zone 18 are longer than the plates near the wall of throat zone 18. Since the gas velocity is greatest at the center of the throat zone, the flat plates should be longer in the center than at the wall. This is because the residence time of each gas molecule over the plate should be the same, whether the molecule enters the throat zone 18 at the throat's axis or near throat wall 48. The approximate length for each plate can be determined by calculating the gas velocity at each zone across the throat width. This design feature ensures essentially that all portions of the gas flow will have equal contact time on each plate as the gas stream passes through the throat zone 18.

In operation, scrubbing liquid (e.g., water) enters the liquid inlet 12 and is injected into converging section 16 as liquid spray, preferably near the top of (or entrance to) the throat zone 18. The liquid is immediately atomized by an incoming high-velocity gas stream into a mist or spray of target droplets. The static pressure of the incoming gas stream is converted to velocity pressure (i.e., kinetic energy) as the gases move through spaces between the plates 38 in the throat zone 18. The target droplets undergo dispersion within the droplet dispersion zones 46 by accelerating the gas stream to a high velocity and then using this kinetic energy to shear the scrubbing liquid into fine droplets. The motive force comes primarily from gas-stream kinetic energy, typically injected into the system by a fan (not shown).

Within the throat zone 18, the liquid target droplets and some (ideally all) particulate matter entrained in the gas stream come into contact. The particulate matter adheres to the target droplets as the gas continues along its path through the venturi scrubber. The particulates held by the droplets are eventually removed from the stream and collected in a conventional manner. Channeling the incoming particulate-laden gas into a series of parallel paths defined by plates 38 where it can interact with the liquid spray enhances the probability of interaction between the created target droplets and particulates in the stream. Drag from the parallel plates slows down droplet dispersion without destroying the dispersion effect. In effect, the parallel plates create a plurality of narrow free stream areas. The net result of this effect is to increase the residence time of the droplets linger in throat zone 18. This increased residence time increases the probability that a given target droplet will impact and intercept a particulate, thereby improving the capture efficiency of venturi scrubber 10.

FIGS. 4 and 5 show different views of one alternative embodiment for changing the hydraulic diameter of the throat zone 18. These figures will be described together for clarity.

FIG. 4 is a view from an outer side of fixed plate group 26' (similar to fixed plate group 26 as shown in FIG. 2). FIG. 5 is a sectional view of the throat zone 18 taken along lines 5—5 in FIG. 4. In this embodiment, blades 50 (one blade 50 is depicted in phantom in FIG. 4) pivot into and out of the fixed plate group 26' within the spaces between adjacent parallel plates 38', as illustrated in FIG. 5.

FIG. 4 depicts adjusting apparatus 52 for moving the blades 50 into and out of the fixed plate group 26'. This adjusting apparatus 52 can be placed completely outside of the throat zone 18 so as not to take up any space within the zone. Adjusting apparatus 52 includes adjustable rod 54 connected through ball joint rod end 56 and connecting rod 58 to arm 60. Arm 60, supported by reinforcing rib 62, is connected to circular boss 64 which is attached to extension portion 66 of rotating support shaft 68 (shown in FIG. 5) by friction and set screw 70.

Turning to FIG. 5, fixed plate group 26' has plates 38' arranged in a manner similar to FIG. 2 described above. However, instead of employing a slidingly engaging movable plate group 28 (as shown in FIG. 2) for adjusting the hydraulic diameter of the throat zone 18, movable blades 50 perform this function. The blades 50 fill a portion of the spaces within the fixed plate group 26' in the same manner as plates 42 shown in FIG. 2. A gap between adjacent plates 38' and blades 50 near rotating support shaft 68 is filled by spacers 72. In operation, reciprocation of the adjustable rod 54 in FIG. 4 along axis A causes rotation of support shaft 68. Each of the blades 50 are coupled to support shaft 68 so that rotation of the support shaft 68 by the FIG. 4 adjusting apparatus 52 causes movement of the blades 50 into and out of the throat. It should be recognized that adjustable rod 54 in FIG. 4 can be connected to position control means 30 (not shown) which is responsive to a signal representing the throat zone gas velocity as described with respect to FIG. 1. In this manner, the position control means 30 would cause the adjustable rod 54 to move inward or outward in dependence upon the throat zone gas velocity. In turn, this rod movement would cause blades 50 to move into and out of the throat, thereby adjusting the hydraulic diameter of the throat zone 18.

In FIG. 5, adjustable blades 50 are shown extending into the throat from the right-hand side of fixed plate group 26'. However, it should be recognized that two identical apparatus could be mounted on opposed sides of the throat zone 18. Such an embodiment is shown in FIG. **6*a***.

FIG. **6*a* depicts a sectional side view of fixed plate group 26' with adjustable blades 50 between adjacent fixed plates 38'. Visible in this view is fixed plate 38' which is partly held in place within frame 36' by blade rests 74. Movable blades 50 are shown by solid lines in their fully retracted position resting against blade rests 74 and in phantom in an extended position. Each blade 50 has a bushing 76 on one end which is slid onto support shaft 68. Support shaft 68 preferably has a flat portion 78 for attachment of a set screw (not shown) so as to secure each blade 50 to the support shaft 68**.

It should also be noted that the blades in FIG. 5 can be rotated outward (completely out of the throat) for servicing. Also, the shape of the blades can be varied. For example, blades 50' may have a flat oval shape as shown in FIG. **6*b* so that oppositely disposed sides of the blade are relatively symmetrical. Furthermore, when the fixed plates 38 or 38' have different lengths as illustrated in FIG. 3, adjacently disposed blades 50, 50' (or movable plates 42 in the embodiment of FIG. 2**) can also have different lengths.

FIG. 7 shows an alternative embodiment of a vibrating fixed plate group 26" mounted in throat zone 18. The fixed plate group 26" having plates 38" is mounted within housing 80. The housing 80 (which remains fixed) is connected by bracket 82 to vibrator 84. The vibrator 84 is attached to push rod 86. The push rod 86 is connected to a flexible end plate 88 of fixed plate group 26". Another flexible end plate 88 is disposed on the far side of the fixed plate group 26". The flexibility of these end plates 88 allow for the fixed plate group 26" to freely move within the fixed housing 80. The vibrator 84 vibrates perpendicular to the gas flow (i.e., perpendicular to the orientation of plates 38"), which in turn, causes reciprocation of push rod 86.

In operation, the vibrator 84, through push rod 86, excites the fixed plate group 26" so that it also vibrates in a direction perpendicular to the gas flow. Empty spaces 90 between either sides of the fixed plate group 26" and the housing 80 allow for a small displacement of the fixed plate group 26" during vibration. The push rod is covered by boot 92 which acts as a barrier to seal in lubricating fluid and to prevent dust and dirt from clogging the push rod components. The vibrator 82 can be constructed of any conventional vibrating means, for example, a buzzer. The particular type of vibrating means does not form any part of the invention and thus, need not be described with any particularity. In this alternative embodiment, a movable plate group 28 (not shown) can, alternatively, be used and would remain stationary.

The vibration helps to release the liquid film from the plate surfaces (e.g., separating the boundary layer liquid stream from the plates), thereby pushing more liquid into the gas stream for droplet creation. An amplitude of vibration of about $\frac{1}{3}$ of the distance between adjacent plates will normally be sufficient to cause this desired effect. If the fixed plate group 26" was excited fast enough, the standing waves created by the excitation agglomerate particulate matter, enhancing its probability of capture. The use of an adjustable vibrator 84 (e.g., as used in hopper vibrators) allows the user to tune the excitation frequency for maximum effect. Theoretically, this added energy input at the throat should reduce the amount of fan energy input needed for accelerating the incoming gas stream into the venturi scrubber.

FIG. 8a depicts an exploded view of a manually adjusted multiple throat assembly 94, prior to insertion into an empty throat zone tube section 96. The hydraulic diameter of the throat zone can be adjusted by manually turning rod 98.

Figure 8B:
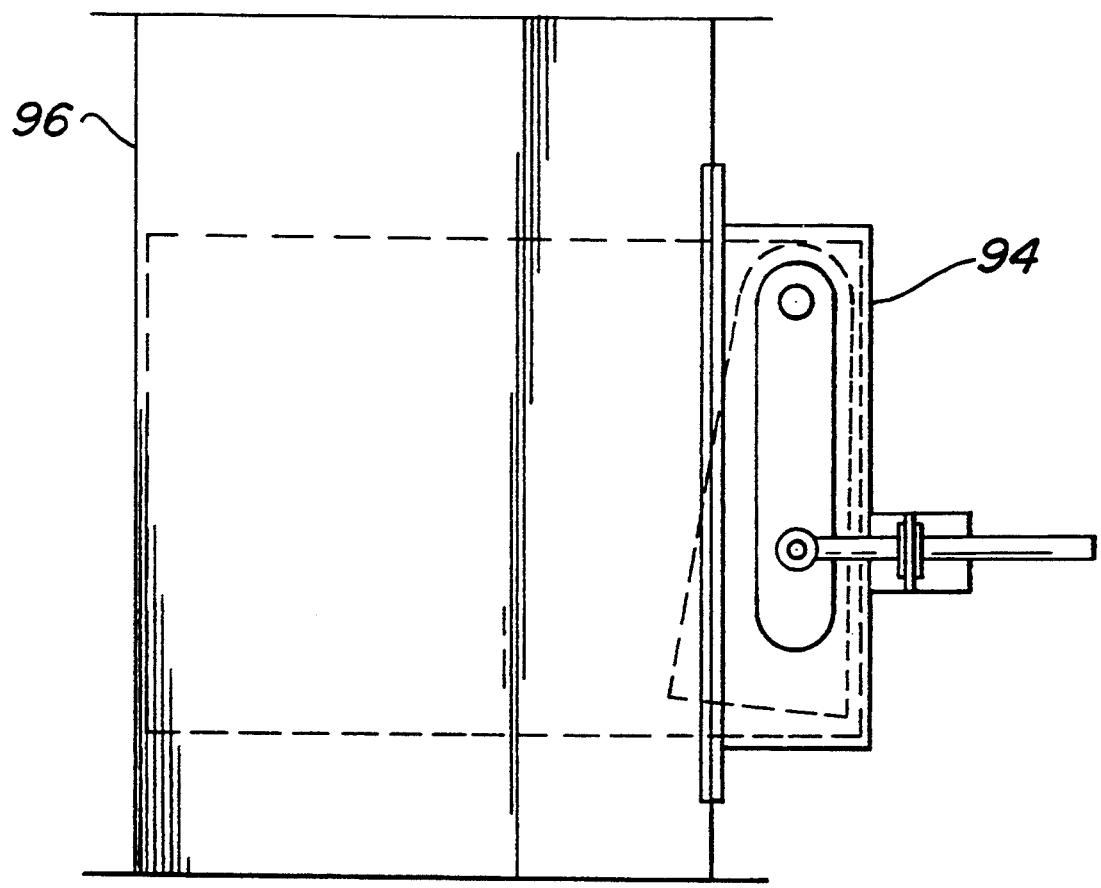
FIG. 8b illustrates a side view of the assembly of FIG. 8b after insertion into the empty throat zone tube section.

FIG. 8b depicts assembly 94 after it has been inserted into the throat zone tube section 96.

As described above, the spacing between the fixed plates and movable plates or blades need not be so small as to create operational or manufacturing tolerance difficulties. In experimental trials, gaps of 9/16 of an inch between adjacent fixed plates 38 were filled with movable plates or blades having widths of 3/16 of an inch with a spacing of 3/16 of an inch on either side.

Generally, the amount of and type of particulate matter entrained in the incoming gas flow determines the desired spacing. For example, if the venturi scrubber was used on a lime kiln where the dust is concentrated and large, ½ of an inch to ¾ of an inch plate spacing would be optimal. However, if the scrubber was part of an incinerator with a low loading of extremely fine particulate, 3/16 of an inch spacing would be more suitable.

The minimum throat width is determined by the solids in the scrubbing liquid that could bridge the gaps and plug the throat. Distances below 3/16 of an inch (or approximately 0.5 cm.) could potentially cause this undesirable effect, although these efficiency robbing effects could occur at distances as great as 3 cm. On the maximum side, distances as great as 8 inches can be used. Of course, distances this great would require venturi throats having much larger diameters.

One manner of determining an appropriate length for the throat plates is to empty an iterative procedure as follows:

Assume a net open area of the throat, A (defined in Equation 4 below). Volumetric flow equations dictate that:

$$Q = A \times v \qquad \text{(Equation 1)}$$

where: Q = treated gas volume, and $v$ = velocity.

From the given volume of gas to be treated and the assumed open area of the throat, $v$ can be calculated.

Figure 9:
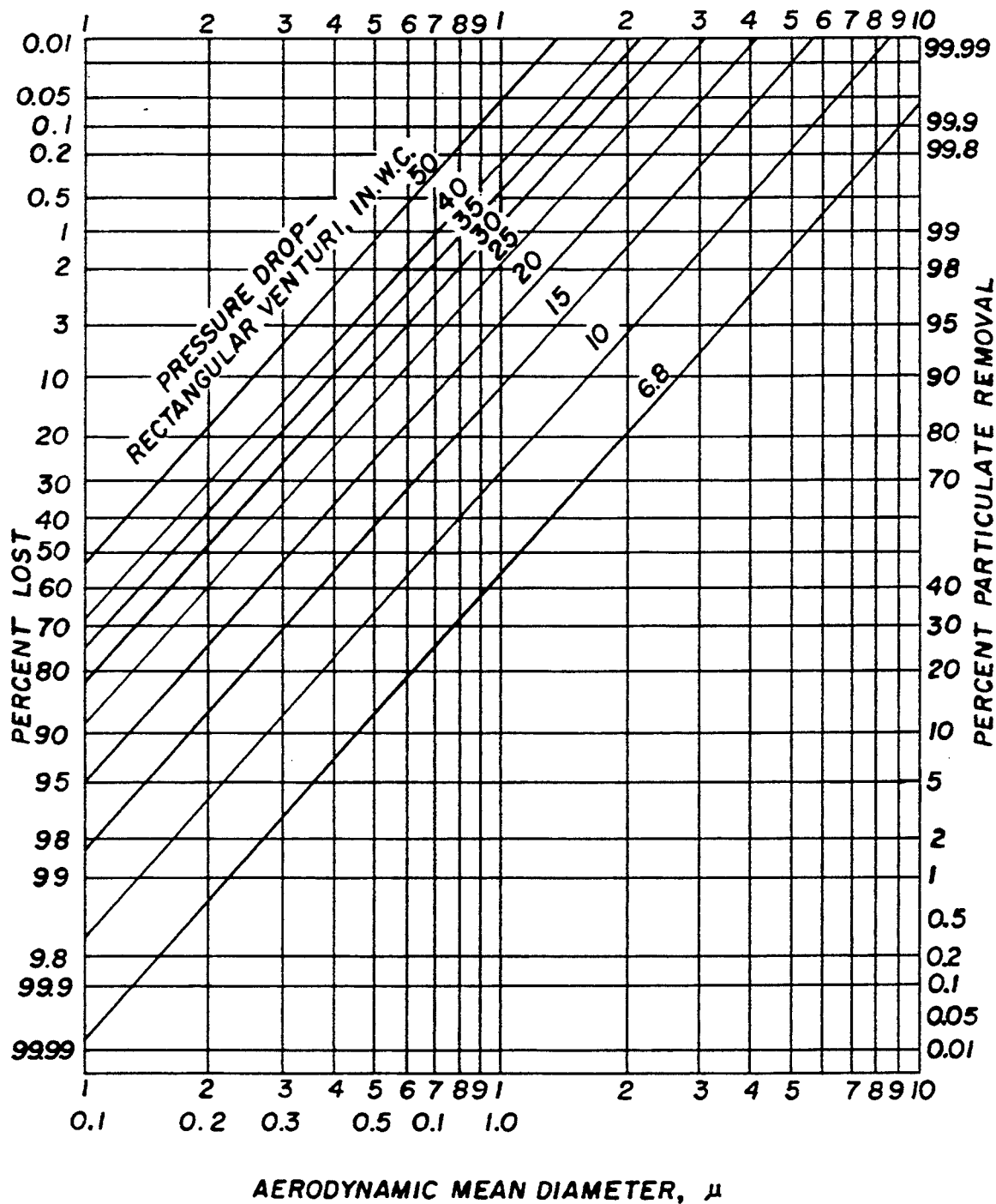
FIG. 9 (prior art) is a typical Grade Efficiency/Penetration Curve for various pressure drops from conventional scrubbers. The pressure drops are used to determine plate parameters.

To remove a certain size particle, a certain pressure drop across the venturi scrubber is needed. FIG. 9 illustrates a prior art "Grade Efficiency/Penetration Curve" for various pressure drops generated by conventional scrubbers. A series of such curves can be generated for the novel multiple-throat, narrow gap venturi scrubber. Thus, to remove a certain size particle, one would know the approximate pressure drop needed.

Empirical data will yield the gas density and liquid-to-gas ratio. The liquid-to-gas ratio increases with increasing particulate loadings. This scrubber will preferably operate at between 2 gallons/1000 acfm and 30 gallons/1000 acfm.

One of many known empirical equations for predicting the venturi scrubber pressure drop in metric and English units is:

$$P \simeq (v^2 d_g A^{0.133} L^{0.78})/3870 \qquad \text{(Equation 2)}$$

where:
P = venturi scrubber pressure drop, centimeters H$_2$O
$v$ = throat velocity of the gas and particles, cm/s
A = throat cross-sectional area, cm$^2$
L = liquid/gas ratio, l/m$^3$
$d_g$ = gas density, g/cm$^3$ or $$P \simeq (v^2 d_g A^{0.133} L^{0.78})/162 \qquad \text{(Equation 3)}$$

where:
P = venturi scrubber pressure drop, inches H$_2$O
$v$ = throat velocity of the gas and particles, ft/s
A = throat cross-sectional area, ft$^2$
L = liquid/gas ratio, gallons per 1000 actual cubic feet gas
$d_g$ = gas density, lb/ft$^3$ The venturi pressure drop, P, is the pressure drop across the working portion of the scrubber. This is measured from the venturi inlet duct, where a uniform free stream velocity has been established, to the outlet duct, where the free stream velocity resumes.

Equations 2 or 3 can then be used to solve for A, the open area of the throat. If the assumed open area A and the required open area are different, one can assume a new open area and then recalculate. This iterative process continues until the net open area of the throat agrees with both the (Q = A × $v$) relationship and the venturi pressure drop equation above.

In the novel multiple throat, narrow gap venturi described above in respect to FIGS. 1–7, the net open area of the throat is the gross open area less the area occupied by the plates.

$$\text{Net Open Area} = \text{Gross Area} - (N \times t \times w) \qquad \text{(Equation 4)}$$

where:
N = number of plates
t = plate thickness
w = plate width (preferably limited to 12 inches)

Using Equation 4, the gross open area of the throat can be calculated. Since the throat width is limited, the throat length measured in the direction of gas flow can then be determined. If the desired plate spacing is known, the number of plates, N, can be varied until a compatible net open area and plate spacing is achieved.

It should be recognized that the process above is iterative because the throat area, A, used in the pressure drop prediction is the "net open area", as defined in Equation 4. After calculating the "net open area" from Equations 2 or 3, one assumes a certain number of plates, plate thickness and spacing between plates. The area by which these plates reduce the gross throat area then determines the throat plate length. The plate spacing must then be rechecked so as to ensure that a discrete number of full plates can be used (i.e., not a discrete number plus a portion of a plate). If the plate spacing is too great, e.g., ¾ of an inch when it is desired to have spacings of 3/16 of an inch, it will be necessary to add extra plates. This will require a recalculation of the net open area to determine whether the desired spacing is maintained.

During this iterative process, the throat width must be kept limited to a desired practical range (e.g., less than one foot) while keeping the net open area consistent with Equations 2 and 3 and the individual plate spacing consistent with the amount and type of particulate matter to be removed.

It should be recognized that a correction factor, K, should be applied to the equations above to compensate for the dry frictional loss of the plates themselves. The correction factor, K, can be determined empirically based upon the plates' material of construction.

For determining plate length when the plates vary in length across the throat, the overall goal is to provide approximately the same residence time of the gas on each of the plates. Thus, if the top surface of each plate is on the same plane, the longer plates would be in the center where the gas velocity is the greatest. Given the randomness of activity in the throat zone, it is nearly impossible to make precise calculations of the throat plate lengths. In addition, the parameters would change as the gas velocity changes. As a practical matter, it has been discovered that the plate length need only approximate the velocity relationship across the throat.

The plate length can be approximated by assuming that the gas velocity profile forms a shallow parabolic curve. This is a well known fact proven by pitot tube velocity pressure traversing ductwork containing moving gas. Practice has shown that throat lengths, measured in the direction of gas flow, of 10–12 inches are adequate for proper mixing in conventional scrubbers, although lengths of as great as 18 inches can be used. In an example where the plates are 10 inches long at the center, the length of the plates as one moves towards the wall of the throat can be determined using this parabolic relationship.

Figure 10:
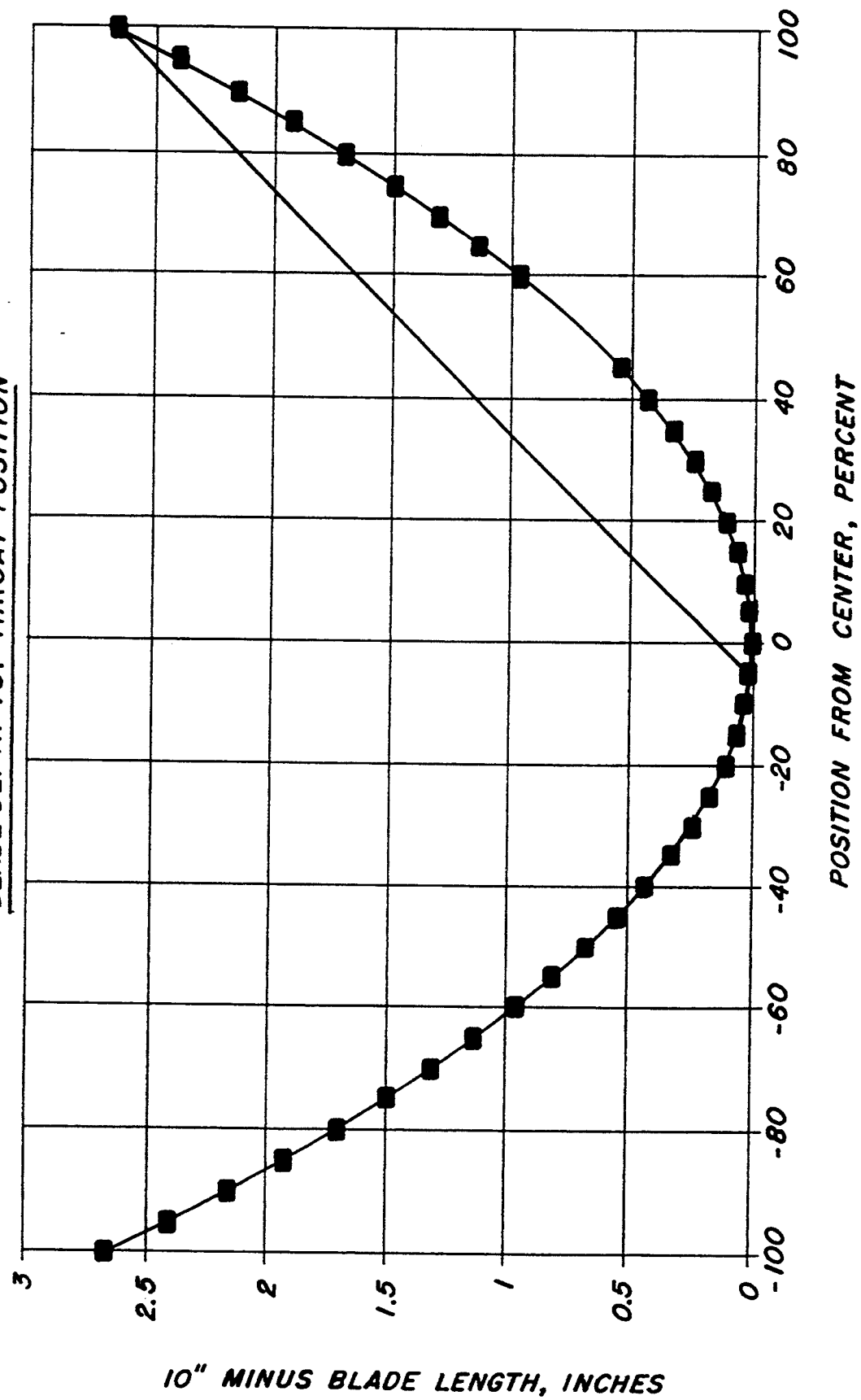
FIG. 10 illustrates a graph of blade or plate depth vs. throat position which can be used to determine variances of blade or plate length across the throat.

FIG. 10 shows a graph of blade or plate depth (length from the top plane downward into the throat) vs. throat position from the center for an exemplary embodiment where the center blade depth is 10 inches. It was calculated from the equation for a very shallow parabola:

$$S = l \times (1 + \tfrac{3}{3}((2d)/l)^2) \quad \text{(Equation 5)}$$

where:
S = parabola length
l = width of the curve (throat width)
d = depth of the curve at the center Equation 5 is applicable only if the depth, d, is small compared to the width, l. It is a catenary shape. In one design example, a ratio of l:d of 10,000:1 was used. Further experimental efforts will yield various curves for different throat pressure drops. As the venturi scrubber pressure drop, P, rises, the curve will become deeper, but the center plate will still be 10–12 inches long. The side plates will become shorter to compensate for the increased velocity and shorter gas/plate residence time.

Determining the optimum throat length (which will determine the optimum range of plate lengths) is a complicated matter and has, heretofore, been arrived at mainly by experimentation. Generally speaking, a throat that is too short will not allow for sufficient time for impaction of the particulate matter in the particulate-laden gas stream with the target droplets. The result of insufficient impaction is low particulate removal efficiency. A throat that is too long will also be undesirable due to excessive frictional losses. Particle impaction can only occur when there is a differential speed between the incoming particulate-laden gas stream and the target droplets. Once the gas stream enters the throat, its speed continuously slows because no energy is being added to allow it to maintain its speed. Eventually, the gas stream reaches the speed of the slow-moving target droplet or visa-versa. (Energy from the gas stream can accelerate the target droplets.) At that point in time, very little impaction occurs due to the small differential speed and unavoidable frictional losses from drag are not offset by any beneficial impaction.

Furthermore, the plate's ultimate length must also be determined by the frictional losses created by the film of liquid at the boundary layer (i.e., the film of liquid which adheres to and runs down the surface of the plates). The friction can help in holding the fine droplet dispersion under control, but can hurt by creating power robbing friction once the dispersion task is completed. By following the empirical example of narrow conventional throat venturis and various published studies, a throat length, measured in the direction of gas flow, of 1'0"to 1'6" (12 to 18 inches) at the center was used.

Of course, it should be recognized that the particular throat length will be a function of the overall dimensions of the venturi scrubber. Thus, a proportionally larger venturi scrubber may call for a proportionally longer venturi zone. Likewise, the overall width of the venturi throat will vary according to the particular application.

The embodiment shown in FIG. 3 depicts plates which extend the entire length of the throat zone with some plates (those near the center of the throat) extending partially into the diverging section. It should be understood that the plates need not run the full length of the throat zone nor is it necessary that any of the plates extend into the diverging section. In the design example of a 12 to 18 inch throat using a 10 inch maximum plate, the top of the plate can begin at or near the top of the throat zone. Thus, no part of any plate would extend into the diverging section.

The invention should not be considered limited to particular plate or throat zone lengths, or to particular spacings between plates. Any lengths or spacings which achieve the novel effects described above are considered to be within the scope of the invention.

Furthermore, the invention should not be considered limited to any particular number of plates. For example, a gas stream of 200,000 acfm passing through a throat zone 12 inches wide by 20–30 feet long and containing 50–60 or more plates could operate according to the principles of the invention.

It should further be recognized that converging section 16 and diverging section 20 can have varying degrees of convergence or divergence, including very abrupt degrees. (Converging and diverging sections can also be expressed as sections having plural cross-sectional areas.) For example, the throat zone 18 can be joined to a converging section 16 or a diverging section 20 that has a single cross-sectional area throughout its length. As long as the cross-sectional area of at least a portion of the converging section 16 and a portion of the diverging section 20 is greater than the cross-sectional area of the throat zone 18, the desired venturi effect will exist.

The novel multiple throat, narrow gap venturi scrubber described above provides significant advantages not contemplated by prior art. This novel structure permits increased particle capture without significantly affecting energy utilization of the scrubber. The novel structure is simple to build and when placed in the venturi zone, does not significantly alter the incoming path flow of gas as it passes therethrough, thereby promoting direct impact collisions between target droplets and particles. The novel structure is also easily retrofitted into existing venturi scrubbers which typically have hollow passageways.

The present invention may be embodied in other specific forms without departing from the spirit or essential attributes thereof and, accordingly, reference should be made to the appended claims, rather than to the foregoing specification, as indicating the scope of the invention.

I claim:

1. A venturi scrubber apparatus having a passageway for the flow of fluid therein, the passageway comprising, in order:
   (a) an upstream zone having an unobstructed upstream section of one or more cross-sectional areas;
   (b) a throat zone having a single throat section with multiple throats therein, the throat section having a selected length measured in the direction of the fluid flow, a cross-sectional area and a total area, the throat section cross-sectional area being smaller than the cross-sectional area of the upstream section, the throat section comprising a barrier structure for providing a non-tortuous path through the throat section, the barrier structure including a first plurality of spaced parallel physical barriers oriented parallel to the direction of fluid flow through the throat zone for forming the multiple throats, the physical barriers being flat plates; and
   (c) a downstream section of one or more cross-sectional areas, the cross-sectional area of the downstream section being greater than the cross-sectional area of the throat section; and
   means for providing a scrubbing liquid upstream of the throat section.

2. Apparatus in accordance with claim 1, wherein there are no divisions between adjacent plates.

3. Apparatus in accordance with claim 1, wherein the spaces between the parallel flat plates are hollow so as to constitute a passageway for the flow of fluid through the throat section.

4. Apparatus in accordance with claim 1, wherein the spaces between adjacent physical barriers is from about 3/16 inches to about 8 inches.

5. Apparatus in accordance with claim 1, wherein the throat length is from about 12 inches to about 18 inches.

6. Apparatus in accordance with claim 1, wherein the number of barriers in the throat section is from about 3 to about 26.

7. Apparatus in accordance with claim 1, wherein the throat section has a substantially rectangular cross-section, and the parallel physical barriers extend from one side of the throat section to an oppositely disposed side of the throat section.

8. Apparatus in accordance with claim 1, wherein the upstream section converges into the throat zone and the downstream section diverges from the throat zone.

9. Apparatus in accordance with claim 1, wherein each plate has a selected length and the lengths of the plates in the throat section substantially, consistently decrease with distance from the axis of the throat section.

10. Apparatus in accordance with claim 1, wherein the fluid flow comprises the scrubbing liquid and particulate-laden gas.

11. Apparatus in accordance with claim 10, wherein the scrubbing liquid and particulate-laden gas flow in a generally cocurrent direction.

12. Apparatus in accordance with claim 1, further comprising means for vibrating the first plurality of spaced physical barriers in a direction perpendicular to the fluid flow.

13. Apparatus in accordance with claim 12, wherein the first plurality of spaced physical barriers are attached to a frame, and the means for vibrating the first plurality of barriers comprises biasing means mounted in the frame.

14. Apparatus in accordance with claim 1, wherein the barrier structure in the throat section further comprises at least one second plurality of spaced parallel physical barriers oriented parallel to the direction of fluid flow through the throat zone, a portion of the space between adjacent first barriers being occupied by respective second barriers in a finger-like interengaging manner.

15. Apparatus in accordance with claim 14, wherein the second set of physical barriers comprise flat plates mounted to a frame.

16. Apparatus in accordance with claim 15, wherein the flat plates are substantially in the shape of a parallelogram with a wedge-shaped cut-out portion facing in the direction of fluid flow.

17. Apparatus in accordance with claim 14, further comprising means for moving the second set of physical barriers with respect to the first plurality of barriers into and out of the throat section, thereby decreasing or increasing the throat total area.

18. Apparatus in accordance with claim 17, wherein the second set of physical barriers comprise substantially flat blades mounted on a rotatable shaft for rotation of the blades into and out of the throat section.

19. Apparatus in accordance with claim 14, wherein the second set of physical barriers are substantially flat and blade-shaped.

20. Apparatus in accordance with claim 19, further comprises at least one rotatable shaft mounted to the venturi scrubber apparatus, the blade-shaped barriers being connected to the shaft.

21. Apparatus in accordance with claim 19, wherein each of the blade-shaped barriers has at least one substantially arcuate shaped end.

22. A venturi scrubber apparatus having means for providing a scrubbing liquid and a passageway for the flow of fluid therein, the passageway comprising, in order:
   an upstream zone having an upstream section of one or more cross-sectional areas;
   a throat zone having a throat section of a selected length measured in the direction of the fluid flow, cross-sectional area and a total area, the throat section cross-sectional area being smaller than the cross-sectional area of the upstream section, the throat section comprising a first plurality of spaced parallel physical barriers oriented parallel to the direction of fluid flow through the throat zone, each barrier having a selected length, the length of the barriers substantially, consistently decreasing with distance from the axis of the throat section; and
   a downstream section of one or more cross-sectional areas, the cross-sectional area of the downstream section being greater than the cross-sectional area of the throat section.

23. Apparatus in accordance with claim 22, wherein the throat zone has a single throat section with multiple throats therein formed by the plurality of spaced parallel physical barriers.

24. Apparatus in accordance with claim 22, wherein the spaces between adjacent physical barriers is from about 3/16 inches to about 8 inches.

25. Apparatus in accordance with claim 22, wherein the throat length is from about 12 inches to about 18 inches.

26. Apparatus in accordance with claim 22, wherein the number of barriers in the throat section is from about 3 to about 26.

27. Apparatus in accordance with claim 22, wherein the throat section has a substantially rectangular cross-section, and the parallel physical barriers extend from one side of the throat section to an oppositely disposed side of the throat section.

28. Apparatus in accordance with claim 22, wherein the upstream section converges into the throat zone and the downstream section diverges from the throat zone.

29. Apparatus in accordance with claim 22, wherein the fluid flow comprises the scrubbing liquid and particulate-laden gas.

30. Apparatus in accordance with claim 29, wherein the scrubbing liquid and particulate-laden gas flow in a generally cocurrent direction.

31. Apparatus in accordance with claim 22, wherein the physical barriers are flat plates.

32. Apparatus in accordance with claim 31, wherein the spaces between the parallel flat plates are hollow so as to constitute a passageway for the flow of fluid through the throat section.

33. Apparatus in accordance with claim 22, further comprising means for vibrating the first plurality of spaced physical barriers in a direction perpendicular to the fluid flow.

34. Apparatus in accordance with claim 33, wherein the first plurality of spaced physical barriers are attached to a frame, and the means for vibrating the first plurality of barriers comprises biasing means mounted in the frame.

35. Apparatus in accordance with claim 22, wherein the throat section further comprises at least one second plurality of spaced parallel physical barriers oriented parallel to the direction of fluid flow through the throat zone, a portion of the space between adjacent first barriers being occupied by respective second barriers in a finger-like interengaging manner.

36. Apparatus in accordance with claim 35, wherein the second set of physical barriers comprise flat plates mounted to a frame.

37. Apparatus in accordance with claim 36, wherein the flat plates are substantially in the shape of a parallelogram with a wedge-shaped cut-out portion facing in the direction of fluid flow.

38. Apparatus in accordance with claim 35, further comprising means for moving the second set of physical barriers with respect to the first plurality of barriers into and out of the throat section, thereby decreasing or increasing the throat total area.

39. Apparatus in accordance with claim 38, wherein the second set of physical barriers comprise substantially flat blades mounted on a rotatable shaft for rotation of the blades into and out of the throat section.

40. Apparatus in accordance with claim 35, wherein the second set of physical barriers are substantially flat and blade-shaped.

41. Apparatus in accordance with claim 40, further comprises at least one rotatable shaft mounted to the venturi scrubber apparatus, the blade-shaped barriers being connected to the shaft.

42. Apparatus in accordance with claim 40, wherein each of the blade-shaped barriers has at least one substantially arcuate shaped end.

43. A method for treating a stream of effluent fluid containing entrained particulates comprises:
 (a) introducing the effluent fluid into a single throat section of a venturi having a plurality of spaced parallel physical barriers oriented parallel to the direction of fluid flow through the throat section for forming multiple throats within the throat section, the physical barriers being flat plates;
 (b) simultaneously causing target droplets to form in the throat section and to disperse throughout the spaces between the flat plates; and
 (c) adhering at least some of the particulates to the target droplets as the effluent fluid passes through the throat section, thereby separating the particulates from the stream of effluent fluid.

44. The method of claim 43, wherein step (b) comprises:
 (i) introducing a liquid spray into the throat section; and
 (ii) using the stream of effluent fluid to atomize the liquid spray into target droplets.

45. The method of claim 44, wherein in step (b), at least some of the target droplets are created by shearing of the liquid spray by the effluent fluid.

46. The method of claim 44, wherein the liquid spray is introduced closest to the entrance to the throat section.

* * * * *

UNITED STATES PATENT AND TRADEMARK OFFICE
CERTIFICATE OF CORRECTION

PATENT NO. : 5,336,284
DATED : August 9, 1994
INVENTOR(S) : Kenneth C. Schifftner It is certified that error appears in the above-indentified patent and that said Letters Patent is hereby corrected as shown below:

Col. 11, line 36, "empty" should be --employ--.

<u>In the Drawings</u>

In Figure 10, delete the line diagonal line which intersects the X axis at a value of -5 and intersects the U axis at a value of about 2.7

Signed and Sealed this

Twenty-fifth Day of April, 1995

Attest:

BRUCE LEHMAN

*Attesting Officer*  *Commissioner of Patents and Trademarks*